(12) United States Patent
Bourke et al.

(10) Patent No.: US 8,463,610 B1
(45) Date of Patent: Jun. 11, 2013

(54) HARDWARE-IMPLEMENTED SCALABLE MODULAR ENGINE FOR LOW-POWER SPEECH RECOGNITION

(76) Inventors: Patrick J. Bourke, Pittsburgh, PA (US); Rob A. Rutenbar, Pittsburgh, PA (US)

( * ) Notice: Subject to any disclaimer, the term of this patent is extended or adjusted under 35 U.S.C. 154(b) by 1146 days.

(21) Appl. No.: 12/355,973

(22) Filed: Jan. 19, 2009

Related U.S. Application Data

(60) Provisional application No. 61/011,632, filed on Jan. 18, 2008.

(51) Int. Cl.
*G10L 15/00* (2006.01)
*G10L 15/18* (2006.01)

(52) U.S. Cl.
USPC .......................... 704/257; 704/231; 704/235

(58) Field of Classification Search
USPC ................. 704/255, 257, 231, 235, 256, 270, 704/271
See application file for complete search history.

(56) References Cited

U.S. PATENT DOCUMENTS

| | | | |
|---|---|---|---|
| 5,699,456 A | 12/1997 | Brown et al. | |
| 5,794,197 A | 8/1998 | Alleva et al. | |
| 5,870,706 A * | 2/1999 | Alshawi ........................ | 704/255 |
| 5,881,312 A | 3/1999 | Dulong | |
| 5,937,384 A | 8/1999 | Huang et al. | |
| 5,960,399 A * | 9/1999 | Barclay et al. ............. | 704/270.1 |
| 6,314,469 B1 * | 11/2001 | Tan et al. ....................... | 709/245 |
| 6,539,353 B1 | 3/2003 | Jiang et al. | |
| 6,629,073 B1 | 9/2003 | Hon et al. | |
| 6,671,669 B1 | 12/2003 | Garudadri et al. | |
| 6,804,642 B1 | 10/2004 | Naylor | |
| 6,836,758 B2 | 12/2004 | Bi et al. | |
| 7,024,359 B2 | 4/2006 | Chang et al. | |
| 7,080,011 B2 | 7/2006 | Baumgartner et al. | |
| 7,089,178 B2 | 8/2006 | Garudadri et al. | |

(Continued)

FOREIGN PATENT DOCUMENTS

| GB | 0420464.0 | 9/2004 |
|---|---|---|
| JP | 2001265383 | 9/2001 |

(Continued)

OTHER PUBLICATIONS

Glinski, et al., "Spoken language recognition on a DSP array processor," IEEE transactions on parallel and distributed systems, Jul. 1994, pp. 697-703.

(Continued)

*Primary Examiner* — Pierre-Louis Desir
*Assistant Examiner* — Abdelali Serrou
(74) *Attorney, Agent, or Firm* — David Garrod

(57) ABSTRACT

The present invention relates to a low-power speech recognition system. In one embodiment, the speech recognition system is implemented in hardware and includes a backend search engine that operates to recognize words based on senone scores provided by an acoustic scoring stage. The backend search engine includes a scoring engine, a transition engine, and a language model engine. For a frame of sampled speech, the scoring engine reads active acoustic unit models from external memory, updates the active acoustic unit models based on corresponding senone scores received from an acoustic scoring stage, and writes the active acoustic unit models back to the external memory. The scoring engine enters a low-power state until processing for a next frame of sampled speech is to begin. The transition stage identifies any completed words, and the language model engine processes completed words to identify words that are likely to follow in a subsequent frame.

20 Claims, 11 Drawing Sheets

U.S. PATENT DOCUMENTS

| | | |
|---|---|---|
| 7,139,714 B2 | 11/2006 | Bennett et al. |
| 7,203,368 B2 | 4/2007 | Nefian |
| 7,209,880 B1 | 4/2007 | Gajic et al. |
| 7,274,819 B2 | 9/2007 | Matsugu |
| 7,328,153 B2 | 2/2008 | Wells et al. |
| 7,360,068 B2 | 4/2008 | Borgatti et al. |
| 7,451,081 B1 | 11/2008 | Gajic et al. |
| 7,457,750 B2 | 11/2008 | Rose et al. |
| 7,480,617 B2 | 1/2009 | Chu et al. |
| 7,493,258 B2 | 2/2009 | Kibkalo et al. |
| 7,587,319 B2 | 9/2009 | Catchpole |
| 7,664,927 B2 * | 2/2010 | Erlingsson et al. ........... 711/216 |
| 7,716,050 B2 * | 5/2010 | Gillick et al. ................. 704/254 |
| 7,877,258 B1 | 1/2011 | Chelba et al. |
| 7,877,378 B2 * | 1/2011 | Gray ............................. 707/718 |
| 8,290,775 B2 * | 10/2012 | Etezadi et al. ................ 704/260 |
| 2002/0072905 A1 * | 6/2002 | White et al. .................. 704/231 |
| 2003/0026259 A1 * | 2/2003 | Brown .......................... 370/392 |
| 2005/0154589 A1 * | 7/2005 | Nishitani et al. .............. 704/256 |
| 2005/0197837 A1 * | 9/2005 | Suontausta et al. ........... 704/260 |
| 2008/0228691 A1 * | 9/2008 | Shavit et al. ...................... 707/1 |
| 2008/0255839 A1 | 10/2008 | Larri et al. |
| 2009/0043818 A1 | 2/2009 | Raichelgauz et al. |
| 2009/0304268 A1 | 12/2009 | Cadambi et al. |
| 2010/0094858 A1 | 4/2010 | Indeck et al. |
| 2010/0211391 A1 | 8/2010 | Chen |

FOREIGN PATENT DOCUMENTS

| | | |
|---|---|---|
| KR | 20020048357 | 6/2002 |
| WO | 98/57489 A2 | 12/1998 |
| WO | 01/31628 A2 | 5/2001 |
| WO | WO 01/31628 A2 | 5/2001 |
| WO | 02/07148 A1 | 1/2002 |
| WO | 02/31816 A1 | 4/2002 |
| WO | WO 03/094152 A1 | 4/2003 |
| WO | WO2006030214 | 3/2006 |
| WO | 2007/098055 A2 | 8/2007 |
| WO | 2009/070931 A1 | 6/2009 |
| WO | 2009/088718 A2 | 7/2009 |

OTHER PUBLICATIONS

Chatterjee, et al., "Connected speech recognition on a multiple processor pipeline," 1989 International Conference on Acoustics, Speech, and Signal Processing, May 23, 1989, pp. 774-777.

L. Bottou et al., "Speaker-Independent Isolated Digit Recognition: Multilayer Perceptrons vs. Dynamic Time Warping," Neural Networks, vol. 3, 1990, pp. 453-455.

S. Lee et al., "Application of Fully Recurrent Neural Networks for Speech Recognition," IEEE, 1991, pp. 77-80.

R. Lipmann, "Review of Neural Networks for Speech Recognition," Neural Computation, 1989, pp. 1-38.

A. Waibel, "Modular Construction of Time-delay Neural Networks for Speech Recognition," Neural Computation, 1989. pp. 39-46.

K. Lang et al., "A Time-Delay Neural Network Architecture for Isolated Word Recognition," Neural Networks, vol. 3,1990, pp. 23-43.

S. Kong et al., "Differential Competitive Learning for Centroid Estimation and Phoneme Recognition," IEEE Transactions on Neural Networks, vol. 2, No. 1, Jan. 1991, pp. 118-124.

S. Escola et al., "Hidden Markov Models for the Stimulus-Response Relationships of Multistate Neural Systems," Neural Computation 23, pp. 1071-1132 (2011).

R. Veitch et al., "FPGA Implementation of a Pipelined Gaussian Calculation for HMM-Based Large Vocabulary Speech Recognition," International Journal of Reconfigurable Computing, 2011, pp. 1-10.

O. Cheng, et al., "Hardware—Software Codesign of Automatic Speech Recognition System for Embedded Real-Time Applications," IEEE Transactions on Industrial Electronics, vol. 58, No. 3, Mar. 2011, pp. 850-859.

A. Chun, et al., "ISIS: An Accelerator for Sphinx Speech Recognition," 2011 IEEE 9th Symposium on Application Specific Processors (SASP), pp. 58-61.

P. EhKan, et al., "FPGA Implementation for GMM-Based Speaker Identification," International Journal of Reconfigurable Computing, vol. 2011, pp. 1-8.

P. Li, et al., "Design of a Low-Power Coprocessor for Mid-Size Vocabulary Speech Recognition Systems," IEEE Transactions on Circuits and Systems—I: Regular Papers, vol. 58, No. 5, May 2011, pp. 961-970.

L. Li, et al., "Design of Speech Recognition Co-Processor with Fast Gaussian Likelihood Computation," 3rd International Conference on Computer Research and Development (ICCRD), Mar. 11-13, 2011, pp. 392-395.

K. You, et al., "Memory Access Optimized VLSI for 5000-Word Continuous Speech Recognition," J Sign Process Syst, vol. 63 (2011), pp. 95-105.

K. You, et al., "Flexible and Expandable Speech Recognition Hardware with Weighted Finite State Transducers," J Sign Process Syst, published online May 15, 2011.

S Glinski et al., "Spoken Language Recognition on a DSP Array Processor," IEEE Transactions on Parallel and Distributed Systems, Jul. 5, 1994, No. 7, New York, USA, pp. 697-703.

S. Chatterjee et al., "Connected Speech Recognition on a Multiple Processor Pipeline," ICASSP 89, May 23, 1989, Glasgow, UK, pp. 774-777.

R. Krishna et al., "Architectural Optimizations for Low-Power, Real-Time Speech Recognition," CASES '03: Proceedings of the 2003 International Conference on Compilers, Architecture and Synthesis for Embedded Systems, ACM, New York, NY, USA, pp. 220-231.

T. S. Anantharaman et al., "A hardware accelerator for speech recognition algorithms," Proceedings of the 13th Annual International Symposium on Computer architecture, p. 216-223, Jun. 2-5, 1986.

R. Dujari, "Parallel Viterbi Search Algorithm for Speech Recognition," M.S. Thesis, Mass. Inst. of Tech., Feb. 1992.

J. Chong et al., "Data-Parallel Large Vocabulary Continuous Speech Recognition on Graphics Processors," Technical Report No. UCB/EECS-2008-69, May 22, 2008.

M. Ravishankar, "Parallel implementation of fast beam search for speaker-independent continuous speech recognition," 1993.

L. Baugh et al., "Sphinx Parallelization," Sep. 16, 2002.

S.-H. Chung et al., "A Parallel Phoneme Recognition Algorithm Based on Continuous Hidden Markov Model," 13th International and 10th Symposium on Parallel and Distributed Processing, 1999.

M. Fleury et al., "Parallel Structure in an Integrated Speech-Recognition Network," Euro-Par'99, LNCS 1685, pp. 995-1004, 1999.

J Chong et al., "Opportunities and Challenges of Parallelizing Speech Recognition," Proceedings of the 2nd USENIX conference on Hot topics in parallelism, USENIX Association, Berkeley, CA, 2010.

H. Bourlard et al., "Multi-stream speech recognition," Technical Report RR 96-07, IDIAP Research Institute, Martigny, Switzerland, Dec. 1996.

E. C. Lin et al., "A 1000-Word Vocabulary, Speaker-Independent, Continuous Live-Mode Speech Recognizer Implemented in a Single FPGA," FPGA'07, Feb. 18-20, 2007, Monterey, CA, pp. 60-68.

R. A. Kavaler et al., "A dynamic-time-warp integrated circuit for a 1000-word speech recognition system," IEEE J. of Solid State Circuits, Feb. 1987, pp. 3-14.

L. Cali et al., "CO-Design Method Enables Speech Recognition SoC," EETimes, Nov. 2001, p. 12.

B. Mathew et al., "A Low-Power Accelerator for the SPHINX 3 Speech Recognition System," CASES'03, Oct. 30-Nov. 1, 2003, San Jose, CA, pp. 210-219.

S. Nedevschi et al., "Hardware Speech Recognition on Low-Cost and Low-Power Devices," Proc. Design and Automation Conference, 2005, pp. 684-689.

A. Stolzle et al., "Integrated Circuits for a Real-Time Large-Vocabulary Continuous Speech Recognition System," IEEE Journal of Solid-State Circuits, vol. 26, No. 1, pp. 2-11, Jan. 1991.

L. D. Paulson, "Speech Recognition Moves from Software to Hardware," IEEE Computer, Nov. 2006, pp. 15-18.

T. Fujinaga et al., "Parallelized Viterbi Processor for 5,000-Word Large-Vocabulary Real-Time Continuous Speech Recognition FPGA System," Interspeech 2009, pp. 1483-1486.

S. Yoshizawa et al., "Scalable Architecture for Word HMM-Based Speech Recognition and VLSI Implementation in Complete System," IEEE Trans. on Circuits and Systems, Jan. 2006, pp. 70-77.

P. Cardinal et al., "GPU Accelerated Acoustic Likelihood Computations," Interspeech 2008.

P. J. Bourke et al., "A Low-Power Hardware Search Architecture for Speech Recognition," Interspeech 2008.

K. You et al., "Architectural Design and Implementation of an FPGA Softcore Based Speech Recognition System," 6th International Workshop on System on Chip for Real Time Applications, Dec. 2006, pp. 50-55.

A. Burstein et al., "Using Speech Recognition in a Personal Communications System," ICC '92, Jun. 1992, pp. 1717-1721.

P. Saha, "Application Hardware-Software Co-Design for Reconfigurable Computing Systems," Ph.D. thesis, George Washington Univ., May, 2008.

H. Wei, "A speech recognition IC with an efficient MFCC extraction algorithm and multi-mixture models," Ph.D. thesis, The Chinese University of Hong Kong (Hong Kong), 2006 (Preview).

Introduction to Automatic Speech Recognition, 6.345 Automatic Speech Recognition, Lecture # 1, MIT, 2003.

Acoustic Theory of Speech Production, 6.345 Automatic Speech Recognition, Lecture # 2, MIT, 2003.

Speech Sounds of American English, 6.345 Automatic Speech Recognition, Lecture # 3-4, MIT, 2003.

Speech Signal Representation, 6.345 Automatic Speech Recognition, Lecture # 5, MIT, 2003.

Vector Quantization and Clustering, 6.345 Automatic Speech Recognition, Lecture # 6, MIT, 2003.

Pattern Classification, 6.345 Automatic Speech Recognition, Lecture # 7, MIT, 2003.

Pattern Classification, 6.345 Automatic Speech Recognition, Lecture # 8, MIT, 2003.

Dynamic Time Warping & Search, 6.345 Automatic Speech Recognition, Lecture # 9, MIT, 2003.

Hidden Markov Modelling, 6.345 Automatic Speech Recognition, Lecture # 10, MIT, 2003.

Language Modelling for Speech Recognition, 6.345 Automatic Speech Recognition, Lecture # 11-12, MIT, 2003.

A Practical Introduction to Graphical Models and their use in ASR, 6.345 Automatic Speech Recognition, Lecture # 13, MIT, 2003.

R. Singh, Part I: Designing HMM-based ASR systems, 6.345 Automatic Speech Recognition, Lecture # 14, MIT, 2003.

R. Singh, Part II: Training continuous density HMMs, 6.345 Automatic Speech Recognition, Lecture # 15, MIT, 2003.

Segment-Based Speech Recognition, 6.345 Automatic Speech Recognition, Lecture # 16, MIT, 2003.

Finite-State Techniques for Speech Recognition, 6.345 Automatic Speech Recognition, Lecture # 17, MIT, 2003.

ASR for Spoken-Dialogue Systems, 6.345 Automatic Speech Recognition, Lecture # 18, MIT, 2003.

Modelling New Words, 6.345 Automatic Speech Recognition, Lecture # 19, MIT, 2003.

T. J. Hazen, Noise Robustness and Confidence Scoring, 6.345 Automatic Speech Recognition, Lecture # 20, MIT, 2003.

T. J. Hazen, Speaker Adaptation, 6.345 Automatic Speech Recognition, Lecture # 21, MIT, 2003.

Conversational Systems: Advances and Challenges, 6.345 Automatic Speech Recognition, Lecture # 22, MIT, 2003.

Paralinguistic Information Processing, 6.345 Automatic Speech Recognition, Lecture # 23, MIT, 2003.

Lin, EC, et al., "Moving Speech Recognition from Software to Silicon: the in Silico Vox Project," Interspeech 2006, Pittsburgh, PA, Sep. 17, 2006.

P. Bourke, et al., "A Low-Power Hardware Search Architecture for Speech Recognition," Proc Interspeech '08, Sep. 2008.

Kim, CM, et al., "A digital chip for robust speech recognition in noisy environment," Proceedings (ICASSP '01) 2001 IEEE International Conference on Acoustics, Speech, and Signal Processing, May 7, 2001.

E. Lin, "A High Speed Speech Recognition Hardware Engine," Ph.D. Thesis Proposal, Carnegie Mellon University, Pittsburgh, PA, Feb. 21, 2006.

E.C. Lin, et al., "A 1000-Word Vocabulary, Speaker-Independent, Continuous Live-Mode Speech Recognizer Implemented in a Single FPGA," Proc. ACM International Symposium on FPGAs, Feb. 2007.

E. Lin, "A High Performance Custom Hardware Backend Search Engine for a Speech Recognition System," Ph.D. Thesis, Carnegie Mellon University, Pittsburgh, PA, Dec. 13, 2007.

"The Talking Cure," The Economist (Technology Quarterly Issue), p. 11, Mar. 12, 2005.

E. Lin, "A First Generation Hardware Reference Model for a Speech Recognition Engine," M.S. Thesis, Carnegie Mellon University, Pittsburgh, PA, May 1, 2003.

P. Bourke, et al., "A High-Performance Hardware Speech Recognition System for Mobile Applications," Proc. Semiconductor Research Corporation TECHCON, Aug. 2005.

E.C. Lin, et al., "In Silico Vox: Toward Speech Recognition in Silicon," 2006 (Eighteenth) Hot Chips Symposium, Aug. 2006.

S. Shankland, "Chips Promise to Boost Speech Recognition," CNET News.com, Aug. 22, 2006.

L.D. Paulson, "Speech Recognition Moves from Software to Hardware," IEEE Computer, pp. 15-18, Nov. 2006.

R.A. Rutenbar, "Toward Speech Recognition in Silicon: the Carnegie Mellon In Silico Vox Project," Invited Talk, 2007 Brammer Memorial Lecture, Wayne State University, Oct. 2007.

K. Yu, et al., "Generating Small, Accurate Acoustic Models with a Modified Bayesian Information Criterion," Proc. Interspeech 2007, Aug. 2007.

Buitrago, J., et al., "Speech Recognition System and its Automatic Synthesis in Hardware," IEEE Conf. on Electronics, Robotics and Automotive Mechanics Conference, Sep. 28, 2010, pp. 672-676.

O. Cheng, "Embedded Speech Recognition Systems," Ph.D. Thesis, Univ. of Auckland, Sep. 2008.

O. Cheng, et al., "Hardware-Software Codesign of Automatic Speech Recognition System for Embedded Real-Time Applications," IEEE Trans. on Industrial Electronics, Mar. 2011.

R. Veitch, et al., "Acceleration of HMM-based speech recognition system by parallel FPGA Gaussian calculation," VI Southern Programmable Logic Conference, Mar. 24, 2010.

J. Choi, et al., "An FPGA implementation of speech recognition with weighted finite state transducers," 2010 IEEE International Conference on Acoustics Speech and Signal Processing (ICASSP), Mar. 14, 2010.

A. Gomperts, et al., "Development and Implementation of Parameterized FPGA-Based General Purpose Neural Networks for Online Applications," IEEE Transactions on Industrial Informatics, Feb. 2011.

K. You, et al., "Flexible and Expandable Speech Recognition Hardware with Weighted Finite State Transducers," J. of Signal Processing Systems, May 15, 2011.

R. Veitch, et al., "FPGA Implementation of a Pipelined Gaussian Calculation for HMM-Based Large Vocabulary Speech Recognition," International Journal of Reconfigurable Computing, Sep. 2010.

S J Melnikoff, et al., "Implementing a Simple Continuous Speech Recognition System on an FPGA," Proceedings of the 10th Annual IEEE Symposium on Field-Programmable Custom Computing Machines (FCCM'02), 2002.

S J Melnikoff, et al., "Performing Speech Recognition on Multiple Parallel Files Using Continuous Hidden Markov Models on an FPGA," Proc. 2002 IEEE International Conference on Field-Programmable Technology, Dec. 16, 2002.

S J Melnikoff, et al., "Implementing log-add algorithm in hardware," Electronics Letters, Jun. 12, 2003.

S J Melnikoff, et al., "Speech Recognition on an FPGA Using Discrete and Continuous Hidden Markov Models," Proceedings of the 12th International Conference on Field-Programmable Logic and Applications: Reconfigurable Computing Is Going Mainstream, 2002.

S J Melnikoff, et al., "Reconfigurable Computing for Speech Recognition: Preliminary Findings," Proceedings of the 10th International Workshop on Field-Programmable Logic and Applications: The Roadmap to Reconfigurable Computing, 2000.

S J Melnikoff, et al., "Implementing a Hidden Markov Model Speech Recognition System in Programmable Logic," Proceedings of the 11th International Conference on Field-Programmable Logic and Applications, 2001.

S J Melnikoff, "Speech Recognition in Programmable Logic," Ph.D. Thesis, University of Birmingham, Nov. 2003.

F A Elmisery, et al., "A FPGA-Based HMM for a Discrete Arabic Speech Recognition System," Proceedings of the 15th International Conference on Microelectronics, Dec. 9, 2003.

G. Marcus, et al., "An FPGA-based Coprocessor for the SPHINX Speech Recognition System: Early Experiences," International Conference on Reconfigurable Computing and FPGAs, Sep. 28, 2005.

G-D Wu, et al., "Chip Design of LPC-cepstrum for Speech Recognition," 6th IEEE/ACIS International Conference on Computer and Information Science, Jul. 11, 2007.

K Miura, et al., "A Low Memory Bandwidth Gaussian Mixture Model (GMM) Processor for 20,000-Word Real-Time Speech Recognition FPGA System," International Conference on ICECE Technology, Dec. 8, 2008.

J. Chaiwongsai, et al., "An Architecture of HMM-Based Isolated-Word Speech Recognition with Tone Detection Function," 2008 International Symposium on Intelligent Signal Processing and Communication Systems, Feb. 8, 2009.

W. Han, et al., "A Speech Recognition IC Using Hidden Markov Models with Continuous Observation Densities," Journal of VLSI Signal Processing Systems, vol. 47, Issue 3, Jun. 2007.

S.-H. Chung, et al., "A Parallel Phoneme Recognition Algorithm Based on Continuous Hidden Markov Model," 13th International and 10th Symposium on Parallel and Distributed Processing, Apr. 1999, pp. 453-457.

A. Seward, "A fast HMM match algorithm for very large vocabulary speech recognition," Speech Communication 42 (2004), pp. 191-206.

M.-Y. Hwang, et al., "Predicting Unseen Triphones with Senones," IEEE Trans. on Speech and Audio Processing, vol. 4, No. 6, Nov. 1996, pp. 412-419.

Jeong, H., et al., English language abstract of KR1020060108895, "Speech Recognition Apparatus Using Two-Level Dynamic Programming Technique and Hidden Markov Model," Oct. 18, 2006.

Jeong, H., et al., English language abstract of KR1020050037125, "Apparatus for Recognizing Speech Using Hidden Markov Model, Without Using Computer," Apr. 21, 2005.

Shah, S.R., et al., English language abstract of KR1020060018888, "System and Method for Distributed Speech Recognition With a Cache Feature," Mar. 2, 2006.

Och, F., et al., U.S. Appl. No. 60/775,570, filed Feb. 21, 2006.

Och, F., et al., U.S. Appl. No. 60/774,790, filed Feb. 17, 2006.

Spec sheet entitled, "Speech Recognition IC," http://www.talentedsoft.com, Aug. 9, 2010.

"Philips New Speech Recognition IC," http://www.futurlec.com/News/Philips/SpeechChip.html, 1999.

Email entitled, "Voice Recognition Processors (Database): Nov. 29, 1995 Version.".

W. Han, et al., "A Speech Recognition IC Using Hidden Markov Models with Continuous Observation Densities," Journal of VLSI Signal Processing 47, pp. 223-232, 2007.

W. Han, et al., "A Real-Time Chinese Speech Recognition IC With Double Mixtures," IEEE, 2003.

Spec sheet entitled, "NLP-5x: Natural Language Processor With Motor, Sensor and Display Control" Sensory Inc., 2010.

\* cited by examiner

HARDWARE-IMPLEMENTED SCALABLE MODULAR ENGINE FOR LOW-POWER SPEECH RECOGNITION

This application claims the benefit of provisional patent application Ser. No. 61/011,632, filed Jan. 18, 2008, the disclosure of which is hereby incorporated herein by reference in its entirety.

This invention was made with government support under HR0011-07-3-0002 awarded by DARPA. The Government may have certain rights in this invention.

FIELD OF THE DISCLOSURE

The present invention relates to speech recognition, and more particularly relates to a hardware implemented low-power backend search engine for a speech recognition system.

BACKGROUND

The more advanced software speech recognition systems are now approaching their ultimate goal: large-vocabulary, continuous, speaker-independent, real-time speech recognition. However, while accurate, these systems are extremely computationally intensive, requiring the full processing resources of a modern desktop to run in real-time. Such heavy computational requirements either rule out many applications for speech recognition or require making tradeoffs in accuracy.

A high level architecture of a modern, state-of-the-art speech recognition system 10 is illustrated in FIG. 1. The speech recognition system 10 is implemented in software and includes a feature extraction stage 12, an acoustic scoring stage 14, and a backend search stage 16. Generally, speech is acquired, digitized by an analog-to-digital converter (ADC), and segmented into a sequence of overlapping windows at roughly millisecond-level granularity. From here, the first step in speech recognition is to extract meaningful information from each speech segment at the feature extraction stage 12. The feature extraction stage 12 uses digital signal processing (DSP) techniques to find the best parameters, or features, to uniquely discriminate different sounds. This involves a set of filtering actions, spectral analysis (via Fast Fourier Transform (FFT)), nonlinear combination of spectral components in ways consistent with the physiology of the human auditory system, and the calculation of time derivatives of these quantities over several frames of speech to track dynamics. Several common methods have evolved, most notably Mel-Frequency Cepstral Coefficients (MFCC) and Perceptual Linear Prediction (PLP). At the output of the feature extraction stage 12, the features are assembled into a feature vector and passed to the acoustic scoring stage 14. The feature vector is a unique "fingerprint" for speech heard in one input frame.

Next, the acoustic scoring stage 14 receives the feature vector for the speech heard in one input frame, and matches the feature vector against a large library of stored atomic sounds. These atomic sounds are obtained from training over a very large number of speakers, all speaking from a target vocabulary. In the earliest recognizers, these atomic units of speech were phonemes, or phones, where phones are the smallest units of sound that distinguish meaning in different words. There are approximately 50 such phones in the English language, corresponding roughly to the familiar consonant and vowel sounds. For example, "five" has three phones: /f/ /i/ /v/, and "nine" also has three phones: /n/ /i/ /n/.

Modern recognizers improve on this idea by modeling phones in context, as illustrated in FIG. 2. For example, the middle vowel /i/sound in "five" is different than the middle vowel /i/ sound in "nine" because of context. Therefore, as a first complication, for the English language, roughly 50×50×50 sounds—now called triphones—are modeled as the library of recognizable acoustic units. Note that different languages have different basic phones, but the idea works across languages. Each of these ~100,000 sounds is further decomposed into a set of frame-sized sub-acoustic units called senones. A complete model, which is referred to as an acoustic model, at this stage typically has several thousand senones.

Thus, the goal of the acoustic scoring stage 14 is to match the feature vector (a point in feature space) received from the feature extraction stage 12 against a library of atomic sounds (senones, each a complex region in feature space). The most common strategy is to model each senone as a Gaussian Mixture Model (GMM), where a GMM is a weighted sum of Gaussian density functions, each with an appropriately fit mean (center) and variance (radius). For every senone, the acoustic scoring stage 14 calculates a number—a calculated GMM probability—that the just-heard feature matches that senone. Assuming diagonal covariance matrix, the GMM probability for each senone is calculated based on the following equation:

$$PROB_s(X) = \sum_{i=1}^{n(s)} \frac{w_{s,i}}{\sqrt{(2\pi)^d |\Lambda_{s,i}|}} \exp\left(\sum_{j=1}^{d} -\frac{1}{2\sigma_{s,i,j}^2}(x_j - \mu_{s,i,j})^2\right),$$

where $n(s)$ is the number of Gaussians in the mixture, $w_{s,i}$ is a weight of the i-th Gaussian for senone s, $|\Lambda_{s,i}|$ is the determinant of covariance matrix $\Lambda_{s,i}$ for the i-th Gaussian for senone s, $\sigma_{s,i,j}^2$ is the variance for the j-th dimension of d-dimensional density for the i-th Gaussian for senone s, $x_j$ is the j-th element of d-dimensional feature vector X, and $\mu_{s,i,j}$ is the j-th element of a d-dimensional mean for the i-th Gaussian for senone s.

In conventional usage, the logarithm (log) of the GMM probability is used for subsequent computational convenience. This log(probability) is calculated for each senone and delivered to the following backend search stage 16. A complex acoustic model can easily have 10,000 senones, each modeled with 64 Gaussians, in a space dimension between 30 and 50. The output of the acoustic scoring stage 14 is a vector of scores—10,000 log(probability) numbers, in this case—one per senone. Note that a new feature vector is input to the acoustic scoring stage 14 for each frame of sampled speech. In response, the acoustic scoring stage 14 outputs a vector of scores including one score per senone for each frame of sampled speech based on the corresponding feature vector.

The backend search stage 16 delivers a set of most-likely-to-be-heard words as its output based on senone scores provided by the acoustic scoring stage 14 for each frame of sampled speech. Specifically, the backend search stage 16 uses a layered recognition model to first assemble features into triphones (each modeled as a sequence of senones), then into words (stored in a dictionary, each modeled as a sequence of triphones). At the lowest, acoustic level of this process, Hidden Markov Models (HMMs) are used to model each triphone where senones are the states in each HMM. As illustrated in FIG. 3, each triphone is modeled as a linear sequence of states (senones). Looping self-arrows allow for an individual senone to extend over the time for more than one frame of sampled speech. Rightward arrows model progression from one senone, or atomic sound, to another in this triphone. Each transition (represented by an arrow) has a transition probability. An ending "null" state allows the triphone to connect to a following triphone. Mechanically, for each frame of sampled speech, the acoustic scoring stage 14 delivers a set of senone scores, or log(probability) numbers, including a score for each senone. The backend search stage 16 then scores triphones based the senone scores for states of the corresponding HMMs.

Each word in a vocabulary of the speech recognition system 10 to be recognized is decomposed into a set of "overlapping" triphones, i.e., the ending context of one triphone is the beginning context of the next. FIG. 4 shows an example of connecting the triphones /h/ and /i/ in "hi," preceded and followed by silences.

At the top layer of the backend search process, a language model provides additional statistical knowledge of likely word sequences to further aid recognition. As illustrated in FIG. 5, an n-gram model stores probabilities for individual words (unigrams), two-word (bigram), and three-word (trigram) sequences. At its most fundamental level, the backend search stage 16 constructs a network in which the entire language is represented as a huge directed graph. This graph is itself a cross-product of three separate sets of graphs: a language model, which represents words in likely context; a phonetic model of each word, i.e., a linear sequence of phones for each word; and an acoustic model, which is a linear sequence of feature-matched senones for each phone. FIG. 6 shows an example of the language, phone, and acoustic layers of the backend search process for a simple example with a two-word vocabulary. There are two components to search: the construction of the graph, and the process of finding the best path through the graph. In practical recognition systems, the graph is vastly too large to be statically constructed, and so is built dynamically, frame by frame. Pruning operations remove unlikely (low probability) nodes as needed. The best path through the graph can be found using strategies such as the Viterbi algorithm. The result of the backend search is a sequence of recognized (i.e., the most likely) words.

Due to its complexity, the software-based speech recognition system 10 requires significant processing resources in order to operate. This is especially true for real-time, high-accuracy speech recognition for relatively large vocabularies. Such processing resources are unavailable on resource-constrained platforms such as mobile phones, which face severe limitations on size, weight, computational processing capability, memory storage, battery lifetime, and power consumption. Power consumption is the most severe resource limitation because it limits overall computational capabilities and thus speech recognition quality and usability. Such power consumption limitations prevent high accuracy speech recognition from being fully implemented within such resource-constrained devices. As such, there is a need for a high-accuracy, low-power speech recognition system suitable for use in resource-constrained devices such as mobile phones.

SUMMARY OF THE DETAILED DESCRIPTION

The present invention relates to a low-power speech recognition system. In one embodiment, the speech recognition system is implemented in hardware and includes a backend search engine that operates to recognize words based on senone scores provided by an acoustic scoring stage. The backend search engine includes a scoring engine, a transition engine, and a language model engine. For recognition of a frame of sampled speech, the scoring engine reads active acoustic unit models from external memory, updates the active acoustic unit models based on corresponding senone scores received from an acoustic scoring stage of the speech recognition system, and writes the active acoustic unit models back to the external memory. Preferably, the active acoustic unit models are Hidden Markov Models (HMMs) representing corresponding triphones. In this embodiment, at this point, the scoring engine enters a low-power state until processing for a next frame of sampled speech is to begin. The transition stage then reads the active acoustic unit models from the external memory and processes the active acoustic unit models in order to prune active acoustic unit models that are unlikely for the current frame of sampled speech, create or modify active acoustic unit models likely to be transitioned to, and identify any completed words. In one embodiment, the transition stage may be in a low-power state during processing of the active acoustic unit models by the scoring engine. The language model engine processes any completed words identified by the transition engine to identify words that are likely to follow in a subsequent frame of sampled speech. In one embodiment, the language model engine operates in parallel with the transition engine and, optionally, the scoring engine depending on whether the scoring engine has entered a low-power state.

The language model engine preferably utilizes an n-gram analysis to process completed words identified by the transition engine to find words that are likely to follow in a subsequent frame of sampled speech. In one embodiment, the language model engine may utilize a hashing scheme to reduce a number of memory accesses performed by the backend search stage to find trigrams for completed words identified by the transition engine, and therefore reduce power consumption. More specifically, in one embodiment, trigrams in a language model utilized by the speech recognition system, or more specifically information referencing the trigrams in the language model, are stored in a hash table. Due to the size of the language model and thus the hash table storing the trigrams in the language model, the language model including the hash table is stored in external, or off-chip, memory. In order to find trigrams for an identified word, a hash function is used to compute a hash value for the identified word and a preceding word in a word history of the identified word. The hash value is then used as an index to obtain the trigrams for the identified word from the hash table.

In another embodiment, in order to compensate for index collisions resulting from an imperfect hash function, the trigrams in the language model utilized by the speech recognition system are stored in multiple hash tables, where each hash table includes multiple bins for each index, or hash value. In one embodiment, there are two hash tables, each having two bins per index or hash value. Preferably, trigrams are stored in the multiple hash tables according to a cuckoo hashing scheme such that trigrams for a single word pair are stored in one bin of one entry in one of the hash tables. In order to find trigrams for an identified word, for each hash table, a corresponding hash function is used to compute a hash value for the identified word and a preceding word in a word history of the identified word. The hash values for the hash tables are then used as indices to the hash tables in order to find the trigrams for the identified word in the hash tables. By using a hashing scheme to find trigrams for a completed word, the number of memory accesses needed to find the trigrams for the completed word in the external memory is minimized, thereby reducing the power consumption of the backend search engine of the speech recognition system.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
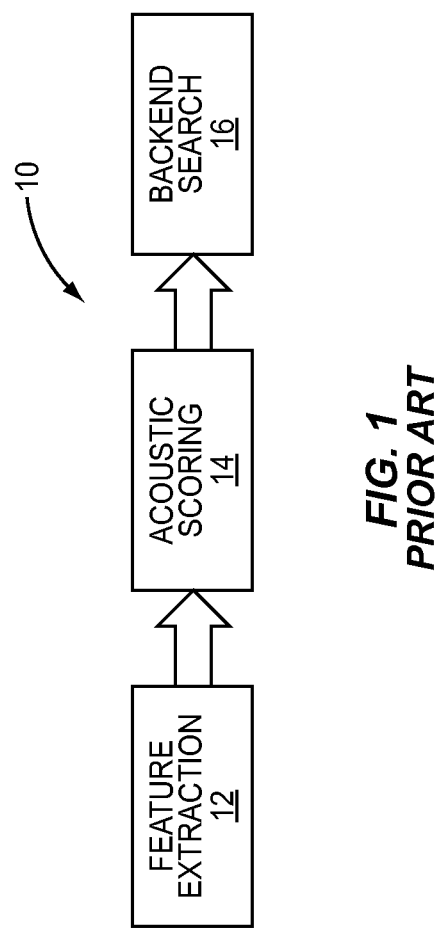
FIG. 1 illustrates decoding stages of a prior art speech recognition system.
Figure 2:
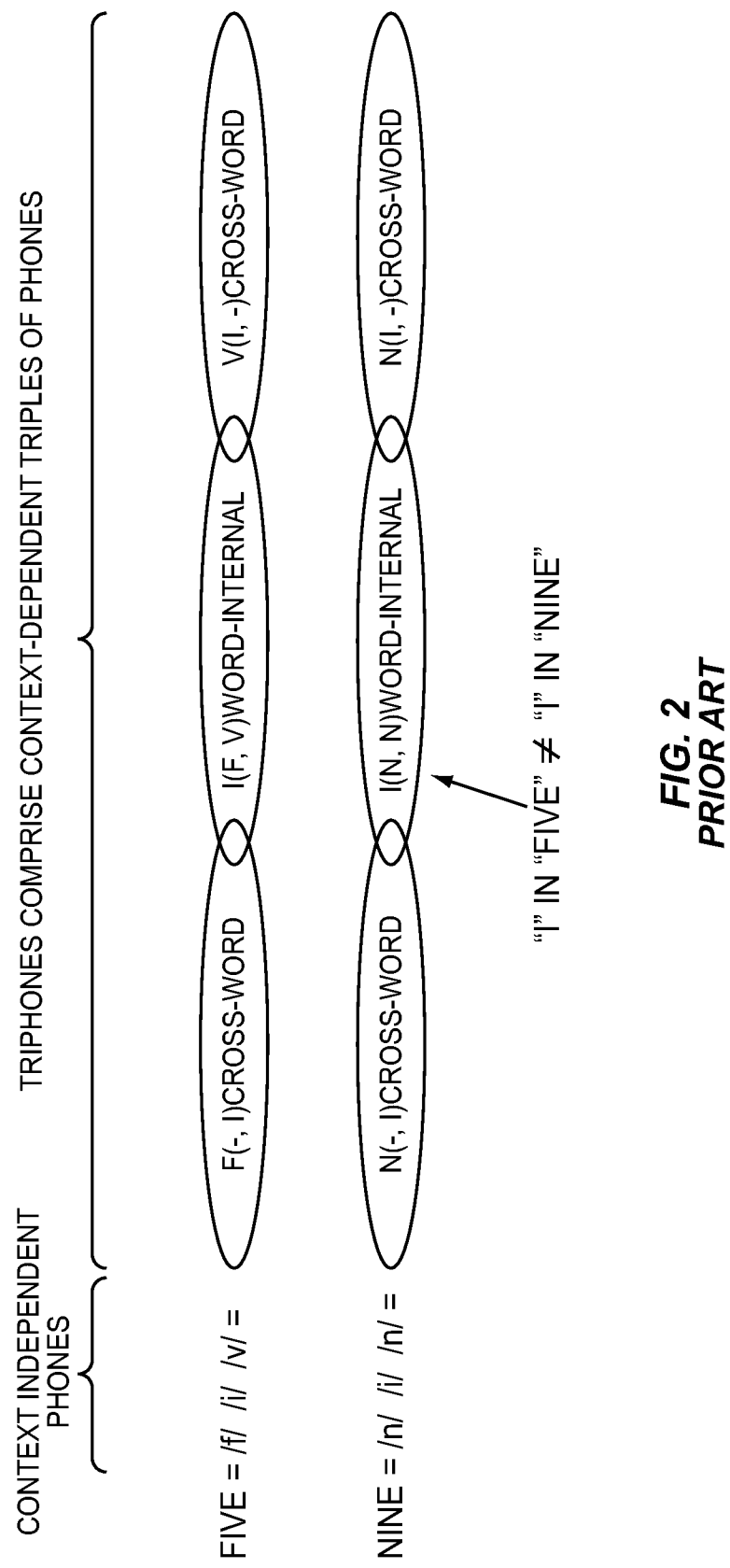
FIG. 2 illustrates context-dependent phones, or triphones, according to the prior art.
Figure 3:
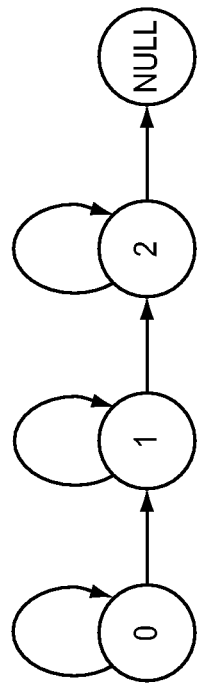
FIG. 3 illustrates a triphone model including a linear sequence of senones, or states, according to the prior art.
Figure 4:
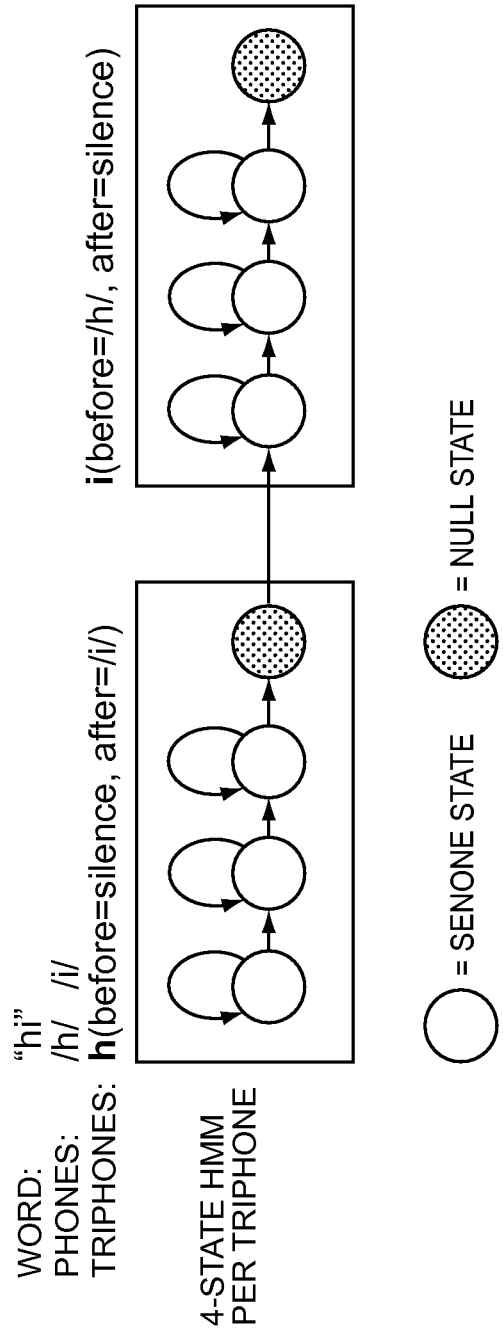
FIG. 4 illustrates the connection from senones, to triphones, to words according to the prior art.
Figure 5:
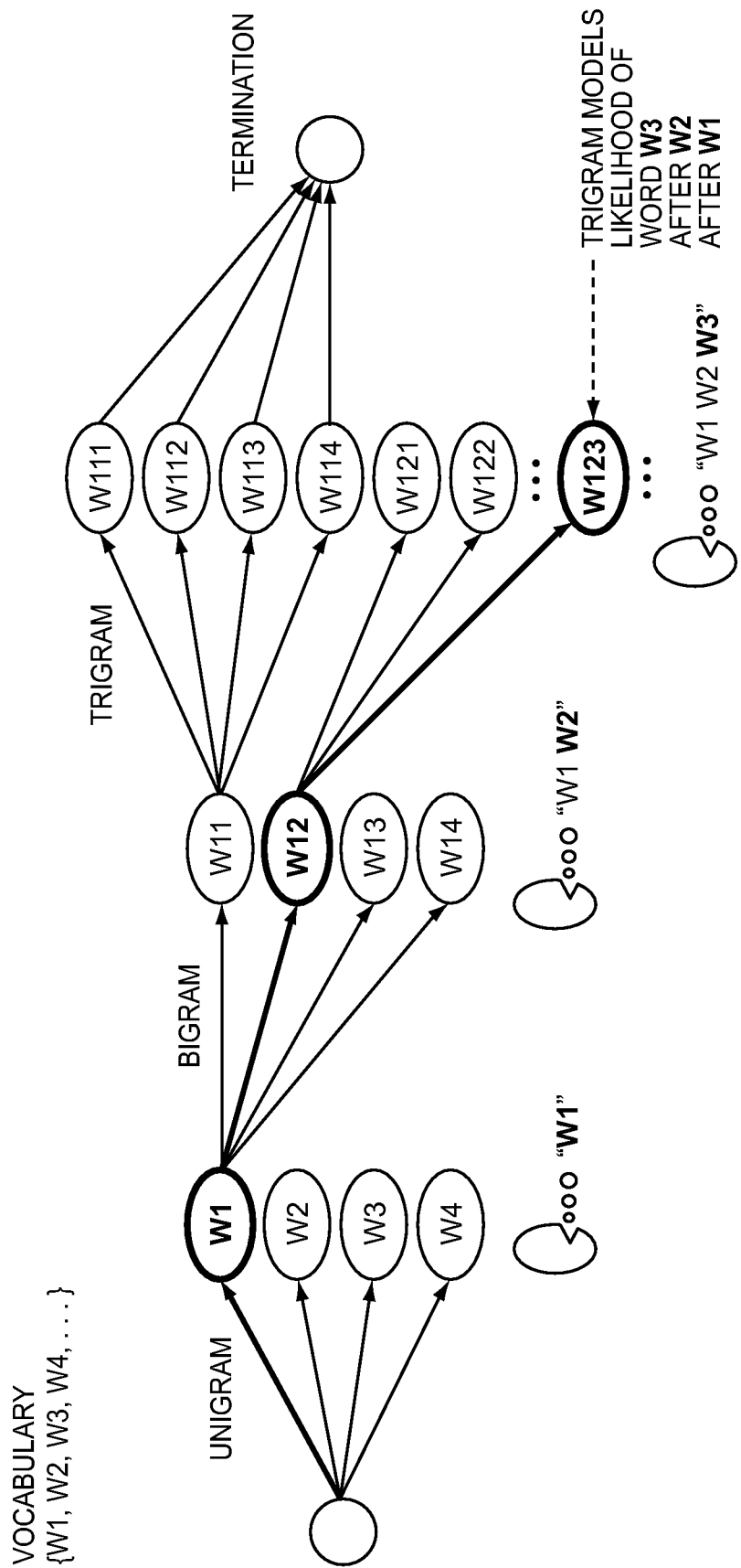
FIG. 5 illustrates an n-gram language model according to the prior art.
Figure 6:
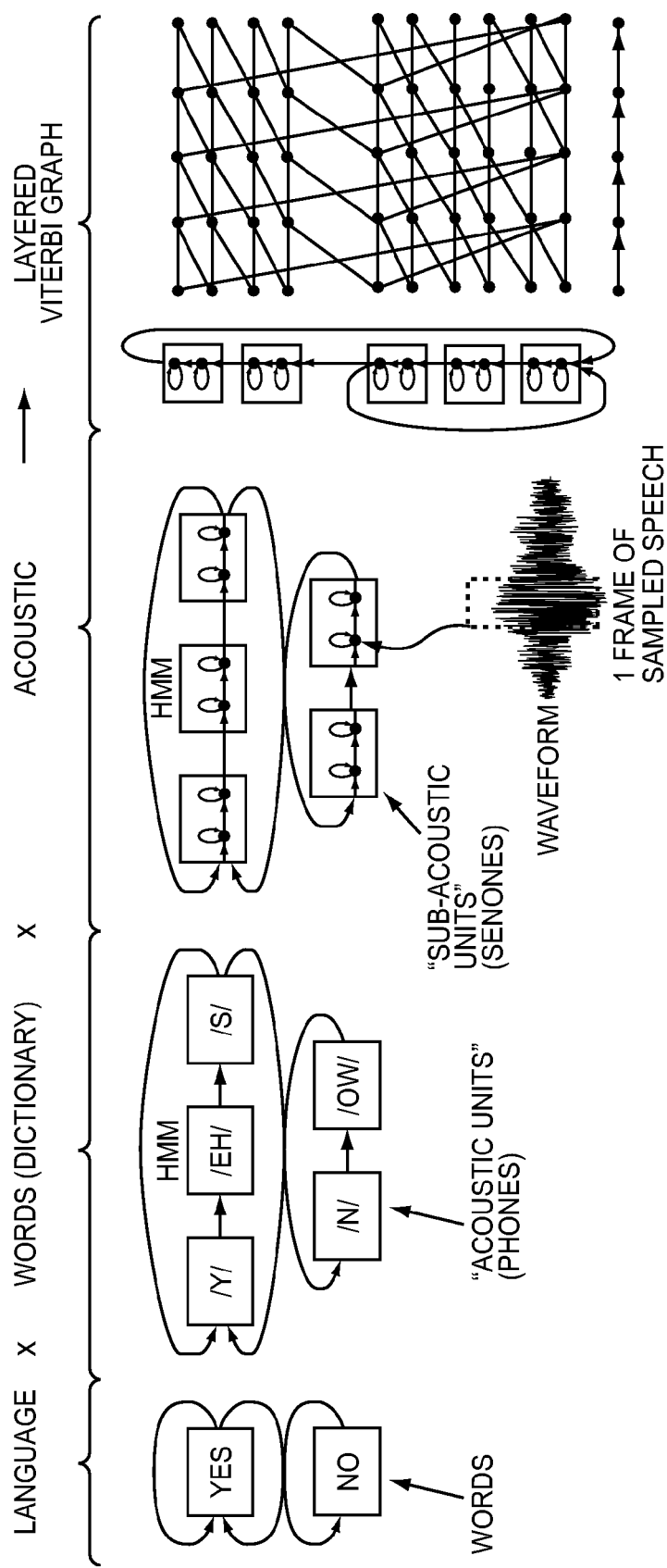
FIG. 6 graphically illustrates layers of the speech recognition process from senones, to phones, to words according to the prior art.
Figure 7:
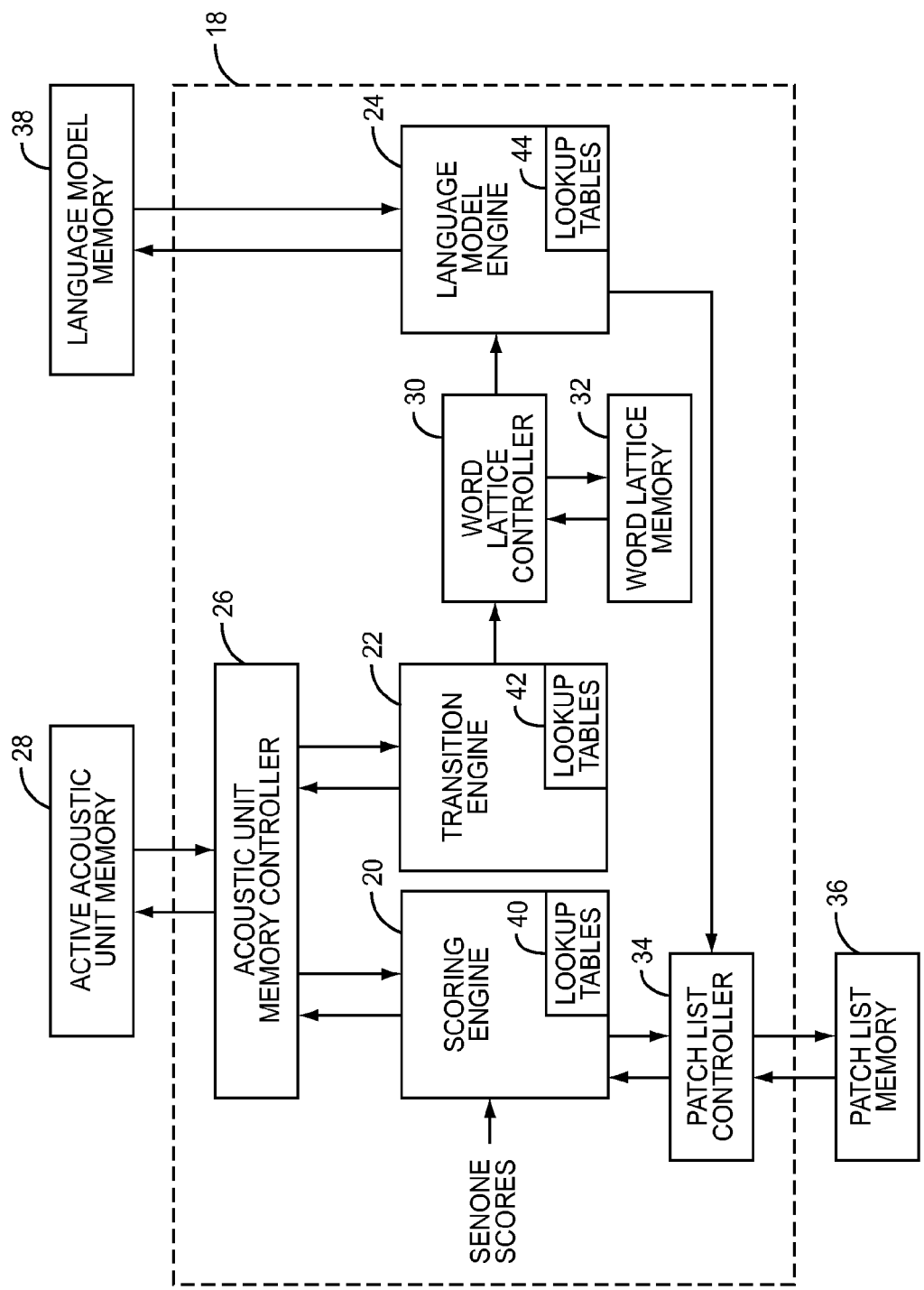
FIG. 7 illustrates a low-power hardware implemented backend search stage, or engine, for a speech recognition system according to one embodiment of the present invention.

The present invention relates to a low-power backend search engine for a speech recognition system that is preferably implemented in hardware. Note, however, that the present invention is not limited to a hardware implementation. The low-power backend search engine may alternatively be implemented in software or a combination of hardware and software. FIG. 7 illustrates a hardware implemented backend search engine 18 for a speech recognition system according to one embodiment of the present invention. In general, the backend search engine 18 operates to receive scores of atomic sounds or senones in an acoustic model from an acoustic scoring stage of the speech recognition system for each frame of sampled speech. Based on the senone scores, the backend search engine 18 produces a string of most likely words.

Preferably, the backend search engine 18 is fabricated on a single integrated circuit (IC) such as, for example, an Application Specific Integrated Circuit (ASIC), a Field Programmable Gate Array (FPGA), or the like. However, in another embodiment, the backend search engine 18 may be fabricated on two or more ICs such as, for example, two or more ASICs, two or more FPGAs, or the like. Further, in this embodiment, the backend search engine 18 has access to one or more external, or off-chip, memory devices such as, for example, one or more Dynamic Random Access Memory (DRAM) devices, Static Random Access Memory (SRAM), one or more flash memory devices, or the like. The one or more external memory devices are used to store data needed for the backend search such as, but not limited to, a language model including a vocabulary or dictionary defining all words that are recognizable by the backend search engine 18 as well as n-grams (e.g., likely word doubles and word triples), active acoustic unit models, and a patch list. Note that additional information may also be stored in the one or more external memory devices for use by the speech recognition system as will be apparent to one of ordinary skill in the art.

In general, the backend search engine 18 includes a scoring engine 20, a transition engine 22, and a language model engine 24. In addition, the backend search engine 18 includes an acoustic unit memory controller 26 that controls access to an external, or off-chip, active acoustic unit memory 28 by the scoring engine 20 and the transition engine 22. The active acoustic unit memory 28 stores acoustic unit models for each of a number of acoustic units that are active for a current frame of sampled speech. As mentioned above, the acoustic units are preferably triphones and are modeled as Hidden Markov Models (HMMs) having linear sequences of states. Each state in an HMM corresponds to a senone.

The backend search engine 18 also includes a word lattice controller 30 that controls access to internal, or on-chip, word lattice memory 32 by the transition engine 22 and the language model engine 24. As discussed below, the word lattice memory 32 stores a word lattice for completed words identified by the transition engine 22. The backend search engine 18 also includes a patch list controller 34 that control access to an external, or off-chip, patch list memory 36 by the scoring engine 20 and the language model engine 24. Note that, in an alternative embodiment, the patch list memory 36 may be internal, or on-chip, memory. As discussed below, in one embodiment, the patch list memory 36 stores a patch list including an entry for each word in the vocabulary of the speech recognition system. Each entry in the patch list includes information such as, for example, a score computed by the language model engine 24, a word history, a left context phone identifier identifying a last phone of a preceding word, and a bit tracking whether a patch for this word exists and, if so, whether the patch has been applied. The entries in the patch list that include a patch are entries for words identified by the language model engine 24 based on an n-gram analysis of completed words from the word lattice.

The language model engine 24 has access to a language model stored in external, or off-chip, language model memory 38. The language model includes information such as trigrams, bigrams, and unigrams for n-gram analysis, data defining triphones forming words in a vocabulary of the speech recognition system, and the like. Lastly, the scoring engine 20, the transition engine 22, and the language model engine 24 have associated lookup tables 40, 42, and 44, respectively, stored in internal, or on-chip, memory.

Recognition for a frame of speech is generally performed as follows. First, the scoring engine 20 reads in active HMMs for a previous frame of sampled speech from the active acoustic unit memory 28 via the acoustic unit memory controller 26, updates state probabilities for each of the active HMMs based on senone scores received from an acoustic scoring unit of the speech recognition system, and writes the active HMMs including the updated state probabilities back to the active acoustic unit memory 28 via the acoustic unit memory controller 26. In addition, the scoring engine 20 creates and scores HMMs for first triphones of any newly activated words identified in the patch list stored by the patch list memory 36. At this point, in one embodiment, the scoring engine 20 may enter a low-power state by, for example, idling or shutting down. Note that, in one embodiment, the transition engine 22 may be in a low-power state while the scoring engine 20 is operating.

The transition engine 22 then reads the active HMMs from the active acoustic unit memory 28 via the acoustic unit memory controller 26. For each active HMM, the transition engine 22 prunes the active HMM if a highest scored state of the active HMM is not greater than a predetermined threshold. Otherwise, the transition engine 22 writes the active HMM back to the active acoustic unit memory 28 alone or writes the active HMM back to the active acoustic unit memory 28 with any additional HMMs to which the active HMM may transition. While processing each active HMM, the transition engine 22 determines whether the active HMM completes a word and, if so, generates an entry in the word lattice stored by the word lattice memory 32 for the completed word. The language model engine 24 processes the entries in the word lattice to identify words that are likely to follow the completed words using an n-gram analysis. The language model engine 24 generates entries in the patch list stored in the patch list memory 36 for the words determined to be likely to occur next based on the n-gram analysis.

Figure 8A:
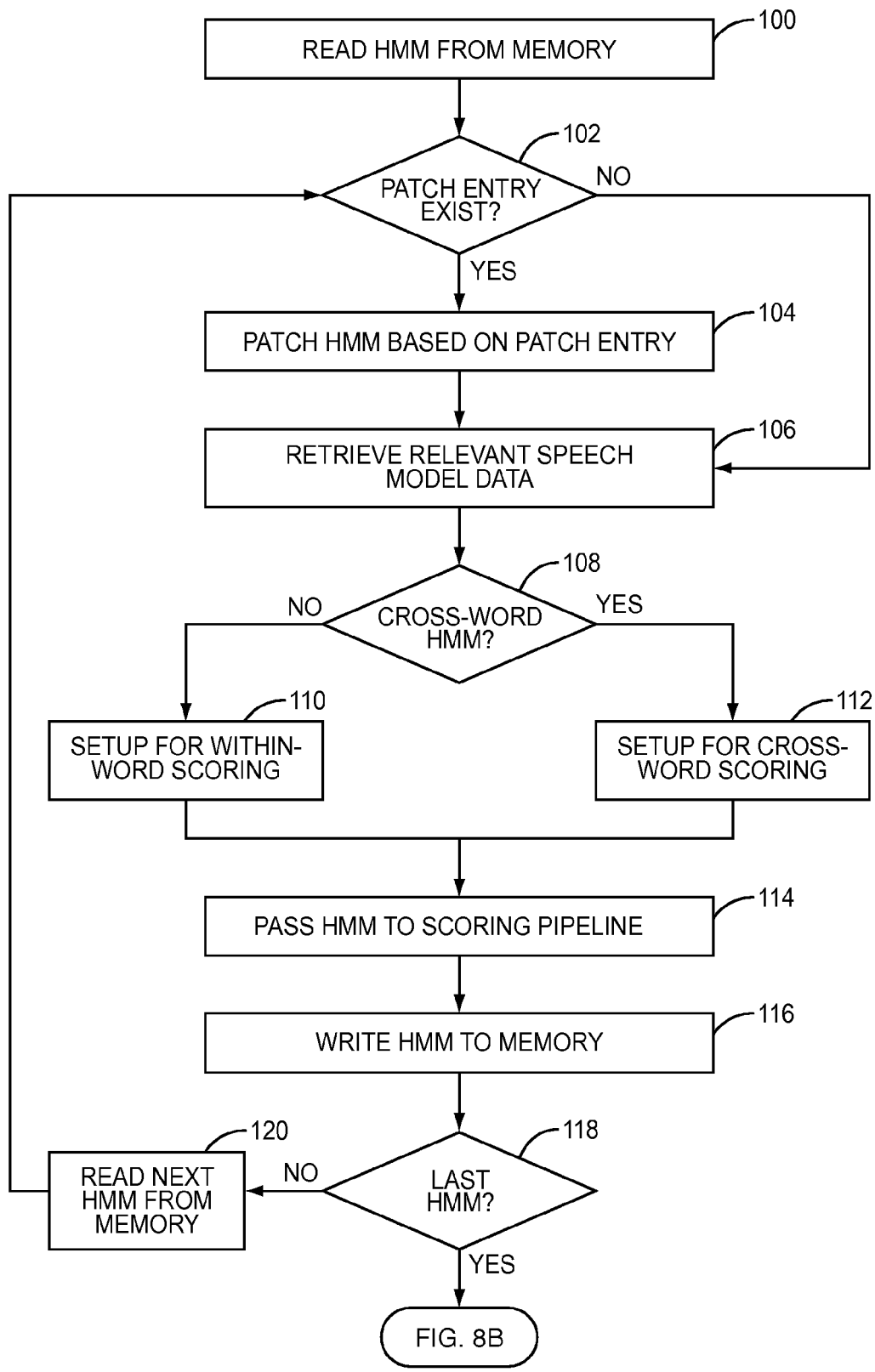
FIGS. 8A and 8B illustrate a flow chart describing the operation of the scoring engine of the backend search engine of FIG. 7 according to one embodiment of the present invention.
Figure 8B:
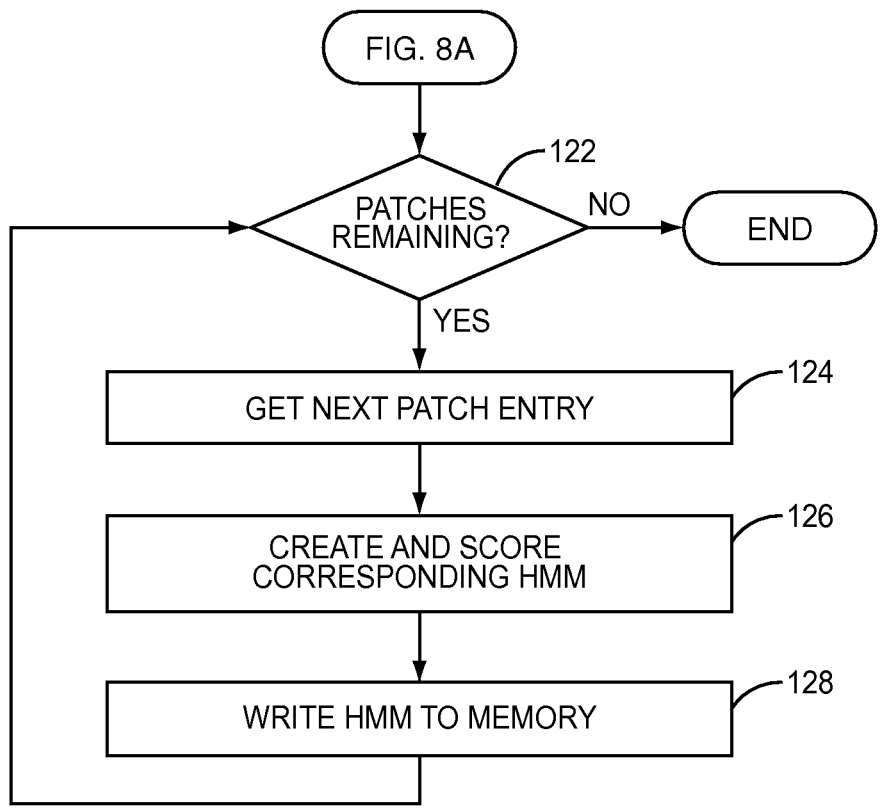

FIGS. 8A and 8B illustrate a flow chart describing the operation of the scoring engine 20 of FIG. 7 according to one embodiment of the present invention. First, the scoring engine 20 reads an active HMM from the active acoustic unit memory 28 (step 100). The scoring engine 20 then determines whether a patch exists in the patch list stored by the patch list memory 36 for the active HMM (step 102). Note that a patch exists for the active HMM if the active HMM models a first triphone of a word and a corresponding entry in the patch list for that word includes a patch. In one embodiment, a bit vector may be utilized to quickly and easily determine whether a patch exists for the word. More specifically, the bit vector may include a bit for each word in the vocabulary of the speech recognition system. When creating patches in the patch list, the language model engine 24 may set corresponding bits in the bit vector to a predetermined value, such as "1." The scoring engine 20 may then examine the bit vector to determine whether a patch exists for a word.

If a patch exists, the scoring engine 20 patches the active HMM based on the patch (step 104). In one embodiment, the patch includes, but is not limited to, a score corresponding to a probability for the word determined by the language model engine 24, a word history identifying a previous word in a word history for the word, and a left context phone identifier. If the score included in the patch list is greater than a score of a first state of the active HMM, then the active HMM is updated to include the score for the word from the patch as the score for the first state of the active HMM.

Next, whether proceeding from step 102 or 104, the scoring engine 20 retrieves relevant speech model data from the associated lookup tables 40 (step 106). The relevant speech model data includes the number of phones in a word, the single phones corresponding to a particular triphone, which triphones can form a word, which senone scores correspond to a particular triphone, the senone scores, which transition probabilities correspond to a particular triphone, and the transition probabilities. The scoring engine 20 then determines whether the active HMM is a cross-word HMM (step 108). The active HMM is a cross-word HMM if the active HMM is an HMM modeling a first or last triphone in a word. If the active HMM is not a cross-word HMM, the scoring engine 20 performs setup for within-word scoring (step 110). If the active HMM is a cross-word HMM, the scoring engine 20 performs setup for cross-word scoring (step 112). The setup for within-word and cross-word scoring differs in the data read for the scoring process. In general, a different set of triphone identifiers (IDs) are read into the scoring pipe depending on whether within-word or cross-word scoring is to be performed.

Figure 9:
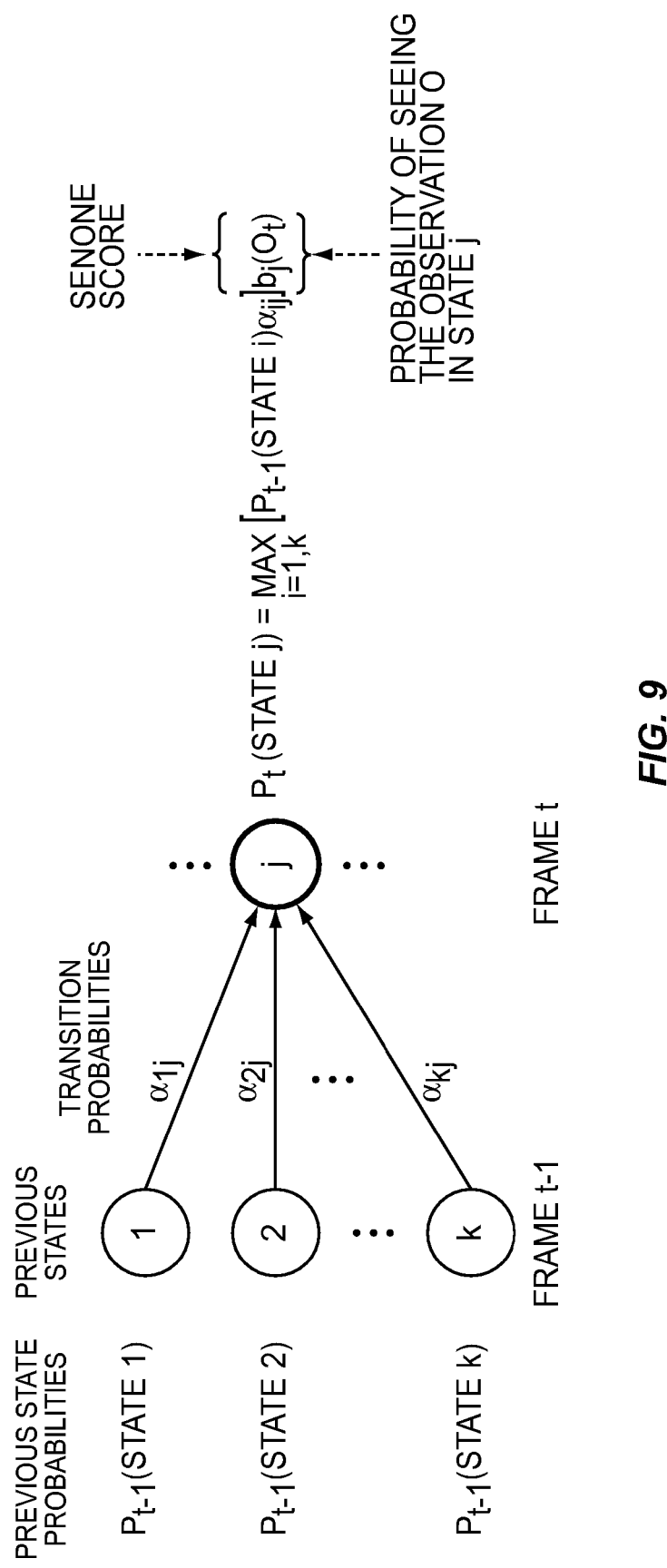
FIG. 9 graphically illustrates a Viterbi scoring process utilized by the scoring engine according to one embodiment of the present invention.

At this point, whether the active HMM is or is not a cross-word HMM, the active HMM is passed to a single scoring pipeline of the scoring engine 20 (step 114). In the preferred embodiment, the scoring pipeline utilizes a Viterbi scoring algorithm to compute updated scores for each state of the HMM based on the corresponding senone scores. More specifically, FIG. 9 graphically illustrates a Viterbi algorithm for updating the state scores for the states of an HMM based on the corresponding senone scores according to one embodiment of the present invention. As illustrated, the state score for state j is represented as a probability or log(probability) defined by the equation:

$$P_t(\text{state}_j) = \max_{i=1,k}[P_{t-1}(\text{state}_i)\alpha_{ij}]b_j(O_t),$$

where $P_t(\text{state}_j)$ is a probability, or state score, for state j of the HMM at time t, $P_{t-1}(\text{state}_i)$ is a probability, or state score, for state i of the HMM at time t−1, $\alpha_{ij}$ is a transition probability for a transition from state i to state j, and k is a number of states that transition to state j. The term $b_j(O_t)$ is a probability of seeing the observation O in state j. The term $b_j(O_t)$ corresponds to the senone score for the senone represented by state j in the HMM. Thus, in order to update the active HMM, for each state, the state score is computed based on the previous state score for that state, the state scores for states that transition to that state, and the transition probabilities for transitioning to that state.

Returning to FIG. 8A, next, the scoring engine 20 writes the active HMM, including the updated state scores, to the active acoustic unit memory 28 via the acoustic unit memory controller 26 (step 116). The scoring engine 20 then determines whether the active HMM is the last active HMM (step 118). If not, a next active HMM is read from the active acoustic unit memory 28 via the acoustic unit memory controller 26 (step 120). The process then returns to step 102 and is repeated.

Once there are no more active HMMs, the process proceeds to FIG. 8B where the scoring engine 20 determines whether there are any remaining patches in the patch list that have not yet been processed (step 122). Again, in one embodiment, if a bit vector is utilized to identify words for which patches exist in the patch list, the bit vector may be consulted to identify the patches for words that have not yet been processed. If there are remaining patches, the scoring engine 20 reads the next remaining patch in the patch list from the patch list memory 36 via the patch list controller 34 (step 124). The scoring engine 20 then creates and scores an HMM for a first triphone of the corresponding word using information contained in the patch (step 126). In general, the patch includes any information needed to create the HMM for the first triphone of the word. More specifically, the patch includes a probability or score for the corresponding word computed by the language model engine 24, which is stored in the HMM as the score for a first state of the HMM. The patch may also include information such as, for example, a word history for the word and a left context phone identifier. Once the HMM for the patch is created, the scoring engine 20 writes the HMM to the active acoustic unit memory 28 via the acoustic unit memory controller 26 (step 128). The process then returns to step 122 and is repeated until there are no remaining patches to process.

As discussed above, once the scoring engine 20 has completed processing for the current frame, the scoring engine 20 may enter a low-power state. The scoring engine 20 may enter the low-power state by idling or shutting down until processing for the next frame is to begin. More specifically, the scoring engine 20 may enter the low-power state by, for example, either disconnecting itself from its supply voltage or being disconnected from its supply voltage by an external controller, by decreasing its supply voltage or having its supply voltage decreased by an external controller, by disconnecting itself from its clock signal or being disconnected from its clock signal by an external controller, or by decreasing a frequency of its clock signal or having a frequency of its clock signal decreased by an external controller. Note that the above techniques for placing the scoring engine 20 in a low-power state are exemplary and are not intended to limit the scope of the present invention. Other techniques for placing the scoring engine 20 in a low-power state may be apparent to one of ordinary skill in the art upon reading this disclosure.

Figure 10:
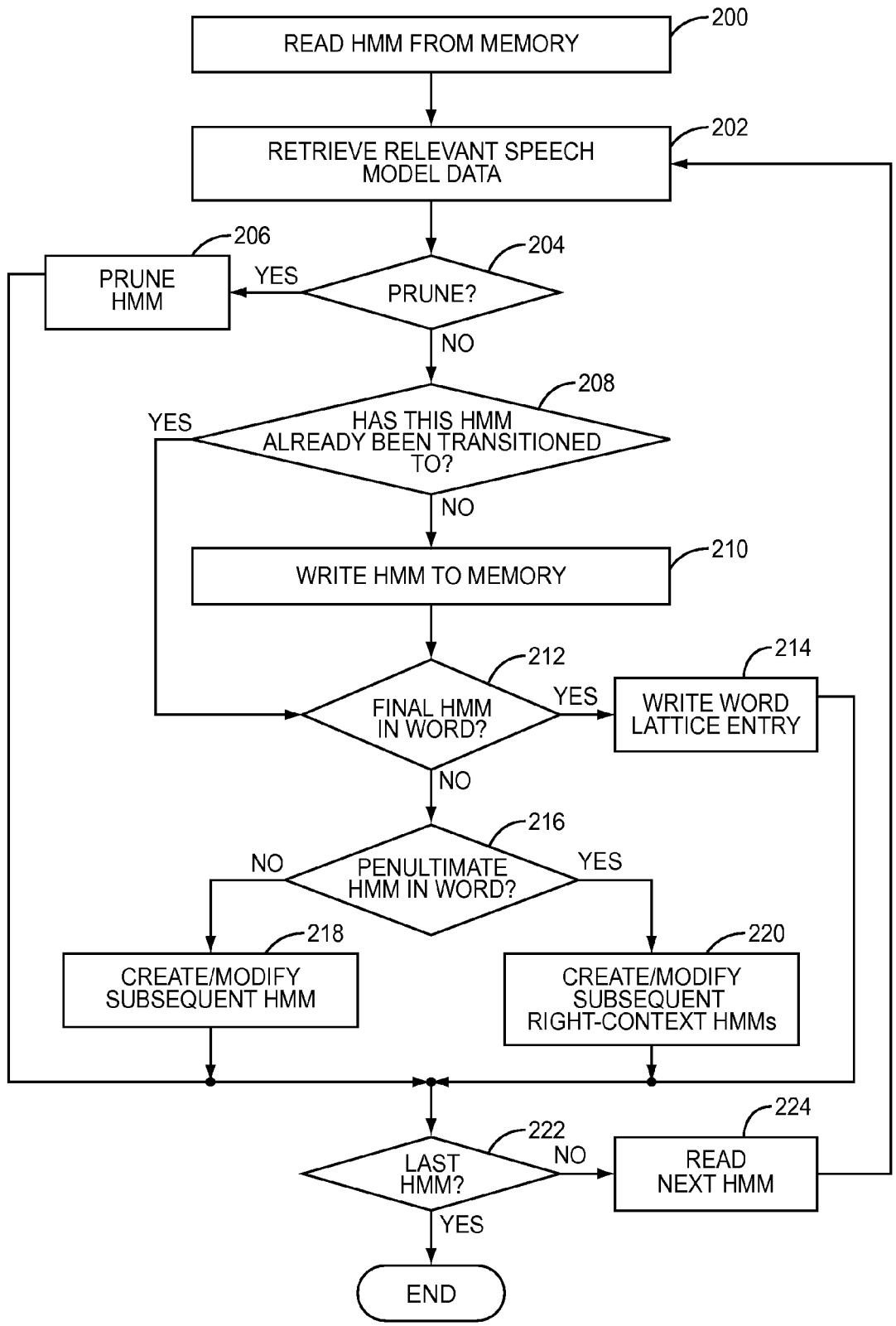
FIG. 10 is a flow chart illustrating the operation of the transition engine of the backend search engine of FIG. 7 according to one embodiment of the present invention.

FIG. 10 is a flow chart illustrating the operation of the transition engine 22 of FIG. 7 according to one embodiment of the present invention. First, the transition engine 22 reads a first active HMM from the active acoustic unit memory 28 via the acoustic unit memory controller 26 (step 200). Next, the transition engine 22 retrieves relevant speech model data from the associated lookup tables 42 stored internally, or on-chip (step 202). The relevant speech model data may include the number of phones in a word, the number of different triphone HMMs that may end a word (depending on the word that follows), the second to last and last single phones in a word, and the new triphone HMMs a given triphone HMM in a word could transition to. The transition engine 22 then determines whether to prune the active HMM (step 204). More specifically, the transition engine 22 determines whether the highest state score of the state scores for the active HMM is greater than a threshold. If the highest state score for the active HMM is not greater than the threshold, the transition engine 22 determines that the active HMM is to be pruned. If a determination is made to prune the active HMM, the transition engine 22 prunes the active HMM (step 206), and operation then proceeds to step 222. In one embodiment, the transition engine 22 prunes the active HMM by not writing the active HMM back to the active acoustic unit memory 28.

If the active HMM is not to be pruned, the transition engine 22 determines whether the active HMM has already been transitioned to (step 208). More specifically, as discussed below, for each processed active HMM, the transition engine 22 creates one or more new HMMs or modifies one or more existing HMMs which are likely to be transitioned to. Thus, if the active HMM is one that was previously created or modified by the transition engine 22 for the current frame, the active HMM is said to have already been transitioned to and operation proceeds to step 212. This is done in order to prevent duplicate copies of the active HMM in the active acoustic unit memory 28. If the active HMM is not one that was previously created or modified by the transition engine 22 for the current frame, the active HMM is said to have not already been transitioned to. As such, the transition engine 22 writes the active HMM to the active acoustic unit memory 28 (step 210).

At this point, whether proceeding from step 208 or step 210, the transition engine 22 determines whether the active HMM is the final HMM in the word (step 212). If so, the transition engine 22 writes an entry to the word lattice stored in the word lattice memory 32 via the word lattice controller 30 for the word (step 214). Note that, in one embodiment, the entry for the word is written to the word lattice only if a score for a final state of the active HMM, which is the final HMM of the word, is greater than a predetermined threshold. The process then proceeds to step 222. If the active HMM is not the final HMM in the word, the transition engine 22 determines whether the active HMM is the penultimate HMM in the word (i.e., the next to last HMM for the word) (step 216). If not, the transition engine 22 creates or modifies an active HMM for the subsequent triphone in the word to which the active HMM may transition and writes the HMM to the active acoustic unit memory 28 (step 218). Specifically, a score of the first state of the created or modified HMM is set to the score of the last state of the active HMM. If the active HMM is the penultimate HMM in the word, the transition engine 22 creates or modifies subsequent right-context HMMs to which the active HMM may transition and writes those HMMs to the active acoustic unit memory 28 (step 220). Specifically, since the active HMM is the next to last HMM in the word, the subsequent HMM is an HMM modeling a last triphone in the word. However, since a right-context of the last triphone is not known, the transition engine 22 creates or modifies HMMs for the last triphone of the word for all of the possible right-context phones. If there are 50 phones in the language, then there will be at most 50 HMMs created or modified for the last triphone of the word.

At this point, whether proceeding from step 206, step 214, step 218, or step 220, the transition engine 22 determines whether the active HMM is the last active HMM in the active acoustic unit memory 28 to process (step 222). If not, the transition engine 22 reads a next active HMM from the active acoustic unit memory 28 (step 224), and operation returns to step 202 and is repeated. Once the last active HMM has been processed, the process ends. In one embodiment, at this point, the transition engine 22 may enter a low-power state until operation of the transition engine 22 for the next frame of sampled speech is to begin. For example, the transition engine 22 may enter the low power state using any of the techniques described above with respect to the scoring engine 20.

Figure 11:
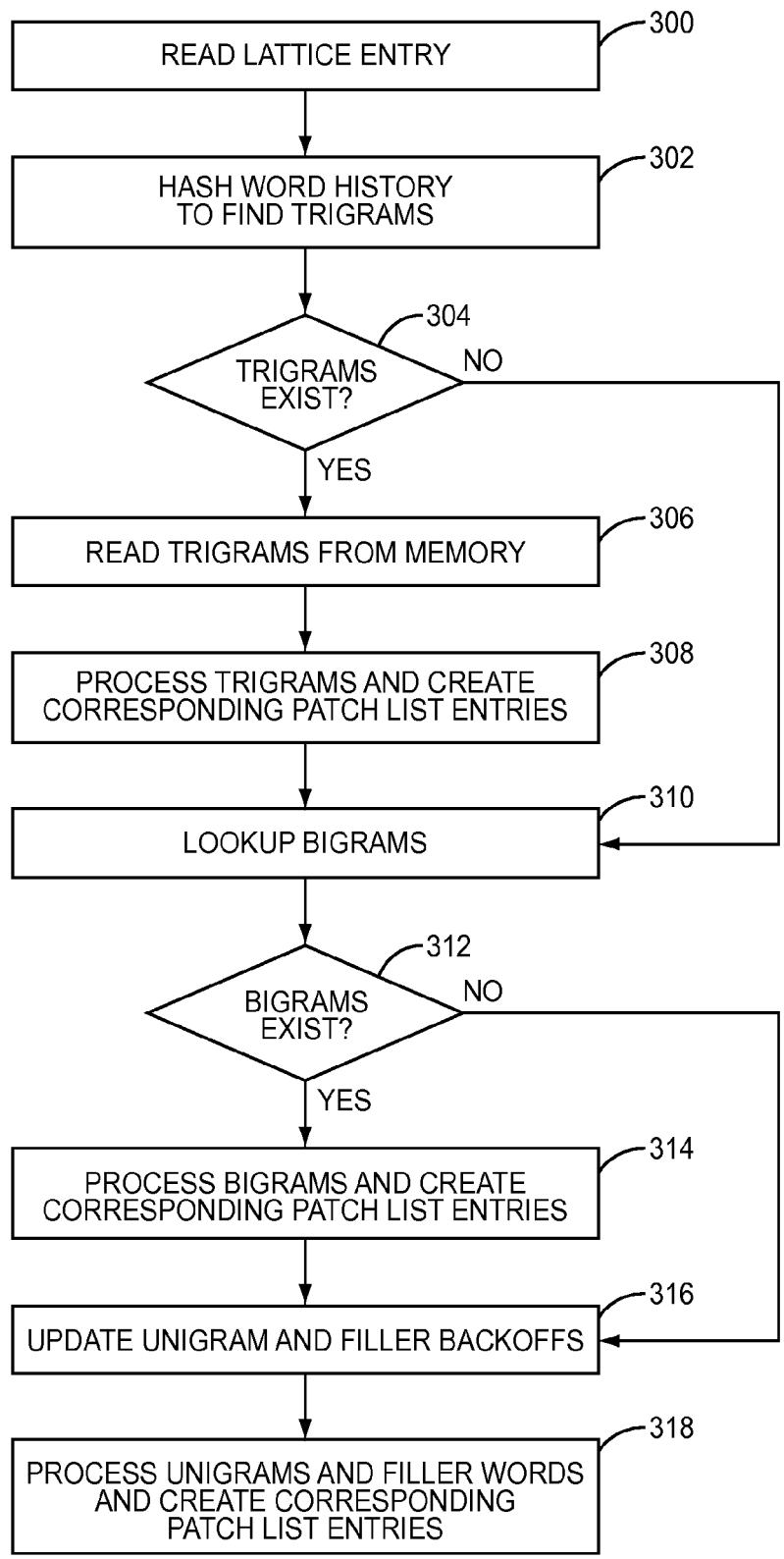
FIG. 11 is a flow chart illustrating the operation of the language model engine of the backend search engine of FIG. 7 according to one embodiment of the present invention.

FIG. 11 is a flow chart illustrating the operation of the language model engine 24 of FIG. 7 according to one embodiment of the present invention. First, the language model engine 24 reads a lattice entry from the word lattice stored in the word lattice memory 32 via the word lattice controller 30 (step 300). The lattice entry identifies a completed word identified by the transition engine 22 and a word history for the completed word. Next, the language model engine 24 performs a hashing technique to find trigrams for the completed word (step 302). Note that while trigrams, bigrams, and unigrams are discussed herein, the present invention is not limited thereto. More specifically, in one embodiment, trigrams in the language model are stored in a hash table stored in the language model memory 38. A hash function is utilized to compute a hash value based on the completed word and a word that precedes the completed word in the word history of the completed word. The hash value is an index for trigrams for the completed word and the preceding word stored in the hash tabled stored in the language model memory 38. Because the hash function may be imperfect (i.e., two different sets of words may result in the same hash value), a hash value collision avoidance scheme may be used.

In another embodiment, a cuckoo hashing scheme may be utilized in order to reduce a size of the hashing table while also providing collision avoidance for imperfect hashing functions. More specifically, in this embodiment, the trigrams in the language model may be stored in two hash tables, each having two bins for each hash value or index. Further, each hash table has a different hash function. Note that while two hashing tables, each having two bins per entry or hash value, are discussed herein, the present invention is not limited thereto. Any number of two or more hash tables, each including two or more bins per entry or hash value, may be used.

In this embodiment, the trigrams are stored in the bins of the two hash tables according to a cuckoo hashing scheme such that trigrams for a single pair of words are stored in one bin of one entry in one of the two hash tables. When lookup of trigrams for the completed word is desired, a first hash function for the first hash table is used to compute a first hash value based on the completed word and the preceding word, and a second hash function for the second hash table is used to compute a second hash value based on the completed word and the preceding word. The first hash value is used as an index to the first hash table, and the second hash value is used as an index to the second hash table. According to the cuckoo hashing scheme, the trigrams for the completed word and the preceding word are stored one of the four bins in the two hash tables corresponding to the two computed hash values or indices. As such, the two bins in the first hash table for the first hash value and the two bins in the second hash table for the second hash value are searched to determine whether trigrams for the completed word and the preceding word exist.

Further, in one embodiment, the hashing functions for the two hash tables are Cyclic Redundancy Check (CRC) functions. Further, for the CRC computations, one or more CRC related lookup tables are stored in the lookup tables 44 of the language model engine 24. These CRC related lookup tables may be configurable or modifiable in order to adjust the CRC functions for different languages, different language models (e.g., language models having different vocabulary sizes), or the same language model. Note that a different CRC related lookup table will result in a different CRC calculation, and different CRC calculations may require different sizes for the associated hash table. As such, even for the same language model, the CRC related lookup tables may be configured to provide CRC calculations that minimize the size of the associated hash tables.

The hashing scheme described above reduces power consumption by minimizing a number of lookups to the external language model memory 38 that are required to identify trigrams for a completed word. Power consumption is also minimized as a result of utilizing CRC functions for the hash functions. The CRC functions run fast and efficiently in hardware, thereby minimizing power consumption.

The language model engine 24 then determines whether one or more trigrams exist for the completed word and the preceding word in the word history of the completed word (step 304). If not, operation proceeds to step 310. If so, the language model engine 24 reads the trigrams for the completed word and the preceding word from the corresponding hash table stored in the language model memory 38 (step 306). The language model engine 24 then processes the trigrams and creates corresponding patches in the patch list stored in the patch list memory 36, if appropriate (step 308). More specifically, each trigram identifies a word, which is referred to herein as an expected word, that is likely to follow the completed word and the word preceding the completed word. For each trigram, a score for the expected word is computed based on a probability associated with the trigram and a score of a last state of a last HMM of the completed word. If the score is greater than a threshold, a patch for the expected word is then created and written to the patch list. The patch for the expected word in the patch list includes the computed score. In addition, the patch for the expected word in the patch list may include a word history for the expected word, a left context phone identifier, or the like.

Next, whether proceeding from step 304 or step 308, the language model engine 24 performs a lookup for bigrams for the completed word (step 310). Bigrams for the completed word identify words that are likely to follow the completed word. Each bigram has an associated probability. The language model engine 24 determines whether there are any existing bigrams for the completed word (step 312). If not, the process proceeds to step 316. If so, the language model engine 24 processes the bigrams for the completed word and creates corresponding patches in the patch list stored in the patch list memory 36, if appropriate (step 314). More specifically, each bigram for the completed word identifies an expected word. Thus, for each bigram for the completed word, a score is computed based on the probability associated with the bigram and the score of the last state of the last HMM of the completed word. If the score is greater than a threshold, then a patch for the expected word is created in the patch list, where the patch includes the score computed for the expected word. In addition, the patch for the expected word in the patch list may include a word history for the expected word, a left context phone identifier, or the like.

At this point, whether proceeding from step 312 or step 314, the language model engine 24 updates unigram and filler backoffs (step 316). More specifically, a maximum backoff is to be applied to scores for unigrams and filler sounds (e.g., coughs, sighs, etc.) if a trigram exists for the completed word, an intermediate backoff is to be applied if a bigram exists for the completed word, and a minimum backoff is to be applied if neither a trigram or a bigram exists for the completed word. Unigrams and filler words, or sounds, are processed and corresponding patches are created in the patch list, if appropriate (step 318). More specifically, the unigrams are scored based on associated probabilities and the backoffs determined in step 316. For each unigram and each filler word, a patch is created in the patch list if the corresponding score is greater than a threshold.

Like the scoring engine 20 and the transition engine 22 discussed above, the language model engine 24 may enter a low power state when operation for the current frame is completed and remain in the low power state until processing for the next frame is to begin. For example, the language model engine 24 may be placed in a low power state using any of the techniques discussed above with respect to the scoring engine 20.

Those skilled in the art will recognize improvements and modifications to the preferred embodiments of the present invention. All such improvements and modifications are considered within the scope of the concepts disclosed herein and the claims that follow.

What is claimed is:

1. An Application Specific Integration Circuit (ASIC) for use in a hardware-implemented backend search engine for a low-power speech recognition system, said ASIC comprising at least:

a scoring engine that includes logic circuitry adapted to
read a plurality of active acoustic unit models from external memory, update each of the plurality of active acoustic unit models based on one or more corresponding senone scores received from an acoustic scoring engine for a current frame of sampled speech, write the plurality of active acoustic unit models back to the external memory, and enter a low-power state after writing the plurality of active acoustic unit models back to the external memory until processing for a subsequent frame of sampled speech is to begin;

a transition engine that includes logic circuitry adapted to process the plurality of active acoustic unit models after the plurality of active acoustic unit models have been updated and written back to the external memory by the scoring engine in order to prune unlikely active acoustic unit models for the current frame of sampled speech, create or modify active acoustic unit models likely to be transitioned to, and identify any completed words, wherein the transition engine is in a low-power state while the scoring engine is processing the plurality of active acoustic unit models; and a language model engine that includes logic circuitry adapted to process any completed words identified by the transition engine for the current frame of sampled speech to identify one or more words that are likely to follow in the subsequent frame of sampled speech.

2. The ASIC of claim 1 wherein the language model engine operates in parallel with at least one of the scoring engine and the transition engine.

3. The ASIC of claim 1 wherein for each completed word, the language model engine is adapted to identify one or more expected words that are likely to follow the completed word using an n-gram analysis, wherein as part of the n-gram analysis the language model engine performs a lookup for n-grams for the completed word in the external memory using a hashing technique.

4. The ASIC of claim 1 wherein for each completed word, the language model engine is adapted to identify one or more expected words that are likely to follow the completed word using an n-gram analysis, wherein as part of the n-gram analysis the language model engine performs a lookup for trigrams for the completed word in the external memory using a hashing technique.

5. The ASIC of claim 4 wherein trigrams in a language model used for speech recognition are stored in a single hash table in the external memory and lookup for the trigrams is performed using a single hash function that computes a hash value for the completed word and a preceding word in a word history of the completed word.

6. The ASIC of claim 4 wherein trigrams in a language model used for speech recognition are stored in a plurality of hash tables in the external memory, each of the plurality of hash tables including a plurality of bins per hash value, and lookup for the trigrams for the completed word comprises:
  for each hash table of the plurality of hash tables, computing a hash value for the hash table based on the completed word and a preceding word in a word history of the completed word using a corresponding hash function; and
  finding the trigrams for the completed word in the plurality of hash tables using the hash values computed for the plurality of hash tables.

7. The ASIC of claim 6 wherein the plurality of hash tables is two hash tables, each having two bins per hash value.

8. The ASIC of claim 6 wherein the trigrams in the language model are stored in the plurality of hash tables according to a cuckoo hashing scheme such that trigrams for a single word pair are stored in one bin for one hash value in one of the plurality of hash tables.

9. The ASIC of claim 6 wherein each of the hash functions for the plurality of hash tables is a Cyclic Redundancy Check (CRC) function.

10. The ASIC of claim 9 wherein the language model engine stores one or more lookup tables in internal memory to assist in computations required for the CRC function for each of the hash functions of the plurality of hash tables.

11. The ASIC of claim 10 wherein the one or more lookup tables for each of the hash functions of the plurality of hash tables are configurable in order to accommodate at least one of a group consisting of: different languages, different language models having different vocabulary sizes, and hash tables of different sizes for a particular language model.

12. The ASIC of claim 1 wherein the scoring engine comprises a single scoring pipeline for scoring both within-word active acoustic unit models and cross-word active acoustic unit models.

13. An Application Specific Integration Circuit (ASIC) for use in a hardware-implemented backend search engine for a low-power speech recognition system, said ASIC comprising at least:
  a scoring engine that includes logic circuitry adapted to read a plurality of active acoustic unit models from external memory, update each of the plurality of active acoustic unit models based on one or more corresponding senone scores received from an acoustic scoring engine for a current frame of sampled speech, and write the plurality of active acoustic unit models back to the external memory;
  a transition engine that includes logic circuitry adapted to process the plurality of active acoustic unit models after the plurality of active acoustic unit models have been updated and written back to the external memory by the scoring engine in order to prune unlikely active acoustic unit models for the current frame of sampled speech, create or modify active acoustic unit models likely to be transitioned to, and identify any completed words, wherein the transition engine is in a low-power state while the scoring engine is processing the plurality of active acoustic unit models; and
  a language model engine that includes logic circuitry adapted to, for each completed word, identify one or more expected words that are likely to follow the completed word using an n-gram analysis, wherein as part of the n-gram analysis the language model engine performs a lookup for trigrams for the completed word in the external memory using a hashing technique.

14. The ASIC of claim 13 wherein trigrams in a language model used for speech recognition are stored in a single hash table in the external memory and lookup for the trigrams is performed using a single hash function that computes a hash value for the completed word and a preceding word in a word history of the completed word.

15. The ASIC of claim 13 wherein trigrams in a language model used for speech recognition are stored in a plurality of hash tables in the external memory, each of the plurality of hash tables including a plurality of bins per hash value, and lookup for the trigrams for the completed word comprises:
  for each hash table of the plurality of hash tables, computing a hash value for the hash table based on the completed word and a preceding word in a word history of the completed word using a corresponding hash function; and finding the trigrams for the completed word in the plurality of hash tables using the hash values computed for the plurality of hash tables.

16. The ASIC of claim 15 wherein the plurality of hash tables is two hash tables, each having two bins per hash value.

17. The ASIC of claim 15 wherein the trigrams in the language model are stored in the plurality of hash tables according to a cuckoo hashing scheme such that trigrams for a single word pair are stored in one bin for one hash value in one of the plurality of hash tables.

18. The ASIC of claim 15 wherein each of the hash functions for the plurality of hash tables is a Cyclic Redundancy Check (CRC) function.

19. The ASIC of claim 18 wherein the language model engine stores one or more lookup tables in internal memory to assist in computations required for the CRC function for each of the hash functions of the plurality of hash tables.

20. The ASIC of claim 19 wherein the one or more lookup tables for each of the hash functions of the plurality of hash tables are adaptable in order to accommodate at least one of a group consisting of: different languages, different language models having different vocabulary sizes, and hash tables of different sizes for a particular language model.

* * * * *